UNITED STATES PATENT OFFICE.

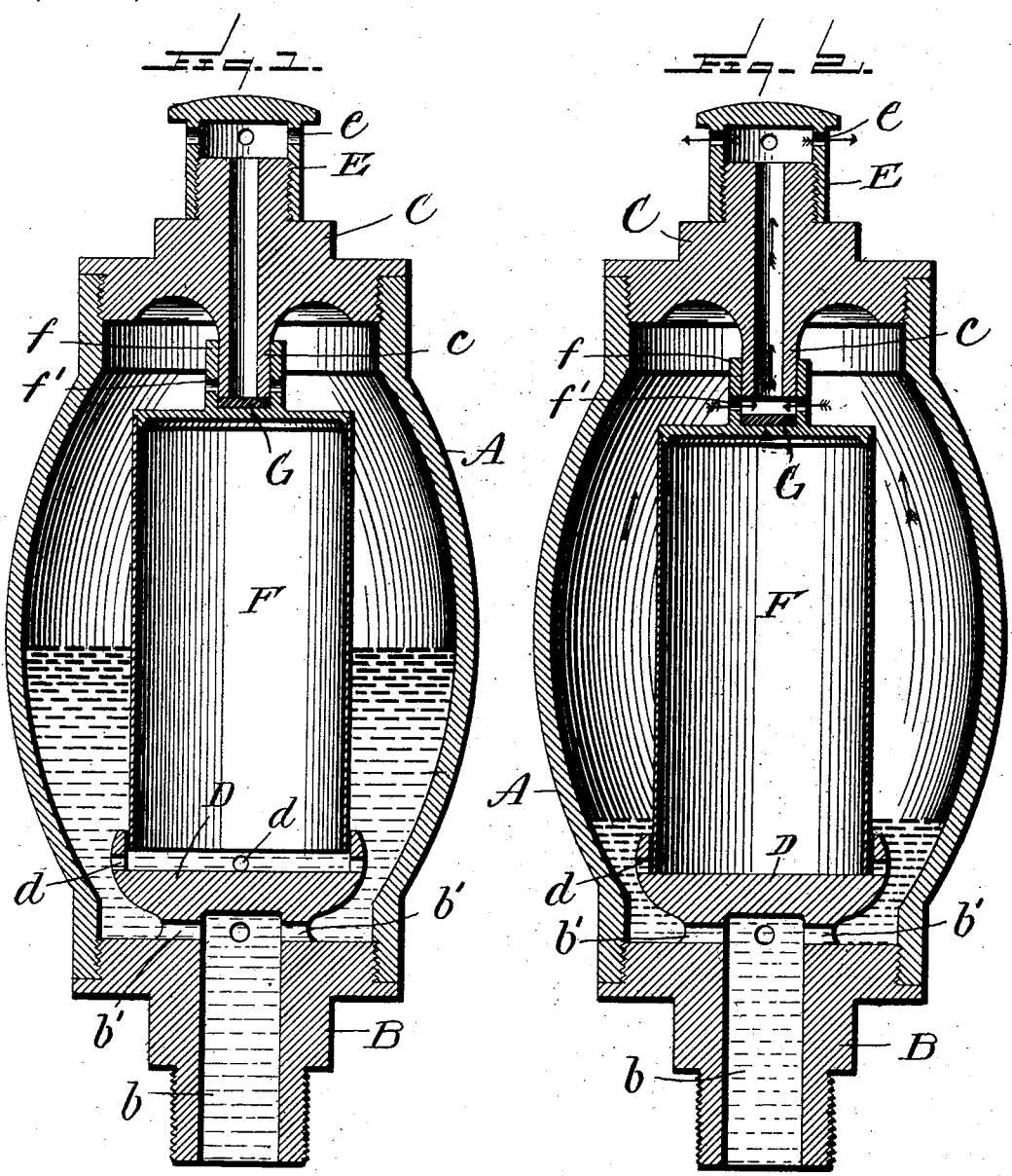

CHRISTIAN E. LOETZER, OF TOWANDA, PENNSYLVANIA.

AUTOMATIC AIR-VALVE FOR WATER-MAINS.

SPECIFICATION forming part of Letters Patent No. 710,480, dated October 7, 1902.

Application filed December 28, 1901. Serial No. 87,574. (No model.)

*To all whom it may concern:*

Be it known that I, CHRISTIAN E. LOETZER, a citizen of the United States, residing at Towanda, in the county of Bradford and State of Pennsylvania, have invented certain new and useful Improvements in Automatic Air-Valves for Water-Mains; and I do hereby declare the following to be a full, clear, and exact description of the invention, such as will enable others skilled in the art to which it appertains to make and use the same.

This invention relates to improvements in automatic air-valves for water-mains.

The principal object of the invention is to provide a simple, compact, and efficient device for attachment to elevated points or "summits" of water-mains which will automatically effect escape of air as it accumulates in the pipes, thereby preventing obstruction to the flow and decrease of water-pressure incident to such accumulation and which will also permit entrance of air into the pipes when the latter are drained for repairs or other purposes, thereby avoiding the formation of vacuums and consequent liability of collapse or breakage of the pipes and joints.

Further objects are to prevent leakage of water through the valve, to obviate changes in operation of the device and to render the same immediately effective whenever the pressure of the accumulated air attains an undesirable limit, and to improve generally upon devices of this same character.

With the above-stated objects in view the invention will first be hereinafter more particularly described with reference to the accompanying drawings, which form a part of this specification, and then pointed out in the claims following this description.

In said drawings, in which corresponding parts in the several views are designated by similar letters of reference, Figure 1 is a vertical sectional view of a device embodying my invention, showing the valve closed; and Fig. 2 is a similar view showing the valve open to permit escape of accumulated air.

Referring to the drawings by specific letters of reference, A designates a suitable valve chamber or casing comprising, preferably, a vertical tubular or bulbous member having a lower detachable plug or nipple B, adapted for attachment to a water-main, and an upper detachable cap or cover C, said plug and cap being exteriorly threaded and screwed into the interiorly-threaded ends of the said tubular member or secured thereto in any suitable manner, and having, preferably, outer polygonal body portions to permit engagement of a wrench or turning device for attaching and detaching the said members. Access to the interior of the valve-chamber for cleaning or other purposes is thus readily afforded. The plug B may be exteriorly threaded at its lower extremity for screwing into a suitable aperture in the water-main and is provided with an internal bore or passage $b$ for admission of water from the main into the valve-chamber, said passage preferably communicating with said chamber by a number of radially or outwardly extending ports $b'$, so as to deflect the water laterally as it enters the chamber to reduce its impact and avoid injury to or premature displacement of the valve. The plug is formed or provided above said water-inlet passage and ports with an upwardly-extending cup-like boss or socket member D, constituting a guide and seat for the float F, hereinafter described, and having one or more lateral apertures or ports $d$ for admission of water from the surrounding chamber.

The cap C is preferably formed or provided with an open tube $c$, depending within the valve-chamber and having its bore continuing upwardly through said cap to provide a suitable air-vent, and a hollow protecting cap or cover E, having a number of lateral apertures or air-ports $e$, is preferably screwed or otherwise secured upon the upper extremity of the cap C to prevent the entrance of foreign substances into the air-vent and chamber.

The float F is designed to rise and fall to close and open the air-vent, according to the height of water in the chamber, and may be of any desired construction, but is preferably in the form of an inverted-cup-like shell or hollow cylinder having its upper end closed and its bottom open and holding a sufficient quantity of air to give it buoyancy. The lower open end of said float is slidably fitted within the cup-like seat or socket member D, which thus serves as a guide therefor, prevents the passage of accumulated air beneath the float, thereby avoiding premature closure of the air-vent, and more completely entraps the air confined in said float, thereby maintaining its buoyancy substantially constant and rendering the device immediately effective in releasing the accumulated air whenever the pressure thereof attains an undesirable limit. At its upper end the float is preferably formed or provided with an upright tube or tubular member $f$, closely fitting around the depending air-vent tube $c$ and provided with one or more lateral apertures or air-ports $f'$, which ports lie below the lower end or opening of the air-vent tube, while the float rests upon the base of its cup-like seat, thus permitting escape of air from the chamber, but pass above said opening when the float rises, thus closing the vent and preventing the escape of water through the valve. It will be observed that the float is perfectly guided in its vertical movements by means of its lower cup-like inclosing seat and the upper interfitting air-vent tube, and, aside from its other advantages, the structure is simple, strong, and compact. In order to prevent leakage of water through the air-vent, a packing disk (or disks) G, of rubber, leather, lead, or other suitable material, is preferably secured within the lower part of the tubular member $f$, which packing-disk when the float rises is forced against the lower open end of the air-vent tube, thereby effecting a water-tight joint.

The operation of the device will be readily understood from the foregoing description, taken in connection with the accompanying drawings. The device being attached to an elevated point or summit of a water-main, the float is raised by the water passing into the chamber, thus preventing leakage; but the air accumulating at such point also arises into said chamber, and when the pressure thereof attains an undesirable limit forces out the water, and thus lowers the float, thus opening communication with the air-vent and allowing the accumulated air to escape. The main and pipes are thus automatically relieved of air as it accumulates therein, thereby preventing obstruction of the flow of the water and decrease of water-pressure. When the main and pipes are drained for repairs or other purposes, the valve permits entrance of air into the main, thus avoiding the formation of vacuums and consequent liability of collapse and breakage, and being located at an elevated point the air entering through the valve materially assists in forcing the water from the main.

It will be understood that the device is susceptible of various modifications in details of construction and arrangement without departing from the scope of my invention.

Having thus fully described my invention, what I claim as new, and desire to secure by Letters Patent of the United States, is—

1. An automatic air-valve for water-mains comprising a chamber having a lower water-inlet passage, a cup-like seat within said chamber above said passage having a lateral water-port, an air-vent tube depending within said chamber, and a hollow open-bottom float fitting within said cup-like seat, said float having an upper tube constantly fitting said air-vent tube and adapted to close and open communication therewith as the float rises and falls according to the height of water in the chamber, substantially as described.

2. An automatic air-valve for water-mains comprising a chamber having a lower water-inlet passage, a cup-like seat within said chamber above said passage having a lateral port for admission of water thereto, an air-vent tube depending into said chamber, and a float fitting within said cup-like seat having an upper tubular portion or member constantly fitting around said air-vent tube, a removable packing within said tubular member adapted to close the end of said air-vent tube when the float rises, and said tubular member having an air-port adapted to pass beneath the lower end of said air-vent tube when the float falls; substantially as described.

3. An automatic air-valve for water-mains comprising a chamber having a lower water-inlet passage, a cup-like seat within said chamber above said passage having a water-port, an air-vent tube depending within said chamber, and a float-valve fitting within said seat having an upper tube constantly fitting said air-vent tube, one of said tubes having an air-port which stands below the lower open end of the other when the float falls and above when the float rises, thus opening and closing communication between the chamber and the external air, substantially as described.

4. An automatic air-valve for water-mains comprising a chamber having a lower water-inlet passage with radially-extending ports to deflect the water laterally as it enters said chamber, a cup-like seat above said ports having a lateral port for admission of water thereto, an air-vent tube depending within said chamber, and a float fitting within said cup-like seat and having an upper tubular part or member constantly fitting said vent-tube, said float having a port adapted to open communication with said vent-tube when the float rests upon its seat and to close communication therewith when the float rises; substantially as described.

5. An automatic air-valve for water-mains comprising a tubular casing, a lower detachable plug adapted for attachment to a water-main, said plug having a passage for water into the casing and an extension above said passage in the form of a cup provided with a water-port, an upper removable cap having a depending air-vent tube, and a float fitting within said cup and having an upper tubular part or member fitting said vent-tube as the float rises and falls and provided with a port, said float being adapted to rise and fall according to the height of water in the casing and thereby to close and open communication with the vent-tube; substantially as described.

In testimony whereof I affix my signature in presence of two witnesses.

CHRISTIAN E. LOETZER.

Witnesses:
W. H. DODGE,
F. W. FROST.